United States Patent Office 3,265,730
Patented August 9, 1966

3,265,730
HIGH ENERGY POLYMERIC SALTS OBTAINED BY REACTING UREA-FORMALDEHYDE POLYMERS WITH A STRONG INORGANIC ACID
Henry Philip Heubusch, Cheektowaga, N.Y., assignor, by mesne assignments, to Bell Aerospace Corporation, Wheatfield, N.Y., a corporation of Delaware
No Drawing. Filed Aug. 24, 1959, Ser. No. 835,386
3 Claims. (Cl. 260—553)

This invention relates to new and useful energy generants and more particularly to that class of energy generants generally known as solid monopropellants of the single compound type. This application is a continuation-in-part of my previously filed application Ser. No. 753,886, now U.S. Patent 3,211,720, filed August 8, 1958. Whereas in the aforesaid application I disclosed a process for producing propellants using nitrogen-containing compounds of the hydrazine types, I have now discovered that highly effective energy generants may be formulated from other nitrogen-containing compounds.

There is today a great need for more powerful, stable and generally more easily handled gas generants, particularly for use as propellants in the rocketry field and also for use in improved pyrotechnics and explosives.

At the present stage of development the propellants being used fall broadly into two categories, liquids and solids. The liquids have the advantage of inherent high energy but the disadvantage of being difficult to handle due to high corrosiveness, high toxicity, and extremely high chemical activity. The solid propellants, or gas generants, have for some time been recognized as being more desirable from the standpoint of handling characteristics, being inherently more stable but up to now no solid fuel has been found which approximates the energy levels obtainable by the use of liquid fuels.

Of the solid fuel developments, the most success has been obtained with composite types, which generally comprise a physical mixture of an oxidizing salt and a fuel-binder. However this approach is limited by the fact that the ingredients which lend themselves to this type of formulation are of relatively low energy level and that the optimum energy level of the more powerful of the available constituents cannot be obtained because the ingredients cannot be satisfactorily combined in the exact proportion which would give maximum energy output.

It will be apparent that there is still a great need for more controllable, safer, and otherwise improved high energy gas generants which combine the respective advantages of the known liquid and solid generants. The advantages gained therefrom will be equally as useful in the explosive and pyrotechnic fields as for propellants.

I have now discovered that by chemically combining a powerful oxidizing acid and a fuel capable of undergoing "combustion," and effecting polymerization of the resulting combination, or by chemically combining a powerful oxidizing acid with a polymerizable fuel at an appropriate point in the polymerization process, a solid, stable and otherwise improved gas generant may be prepared. Furthermore by varying the organic fuel and the amount and type of oxidizing acid, different polymeric products may be obtained, tailored to fit the needs of various gas generating applications. The physical properties of the resulting polymeric materials will vary depending upon the particular selection of organic starting materials employed. Thermoplastic materials varying from balsam-like materials to hard glass-like products can be obtained. In addition, thermosetting compositions whose physical properties will remain virtually unchanged up to the temperature of decomposition may be prepared; again depending upon the proper selection of starting materials.

It is therefor an object of this invention to provide methods for the production of new and useful gas generants.

It is another object of this invention to provide new and useful propellant compositions for use in reaction motors and the like.

Still another object of this invention is to provide new and useful polymeric materials which give outstanding thrust energy levels when used as fuels.

It is still another object of this invention to provide new and useful compounds tailor-made for the several uses to which are put gas generants, pyrotechnics, and explosives.

Other objects will appear hereinafter as the present description proceeds.

I have found that nitrogen containing polymers can be chemically bonded via the nitrogen containing constituent to inorganic oxidizing acids before or at an appropriate point during the polymerization process to yield high molecular weight polymers containing, integrally bonded within the basic recurring unit of the polymer, the inorganic oxidizing acid moiety. The inorganic oxidizing acids which are contemplated for use in the present invention are well known and include nitric acid, perchloric acid, sulfuric acid and phosphoric acid. The nitrogen containing polymers contemplated for use in this invention are myriad and may include such well known examples as urea-formaldehyde and melamine-formaldehyde polymers as well as the poly-urethans such as the product from the diisocyanate of toluene and hexamethylenediamine.

Each of the aforementioned polymers contains a nitrogen atom which is capable, before or at an appropriate step in the polymerization process, of reacting with an acid to form a stable salt. The type of reaction employed to effect polymerization and the point at which salt formation is effected depends on the particular polymer under consideration.

For example, urea and melamine may be reacted with a carbonyl of the aliphatic or aromatic series such as formaldehyde, acetaldehyde, acetone, glyoxal, benzaldehyde and diacetyl to form polymers and at an appropriate step before or during the polymerization process salt formation with an oxidizing acid can be effected to yield products containing up to one mole of acid per atom of nitrogen in the polymer. As pointed out above, by varying the organic starting materials within an homologous series, the ratio of oxidizing acid to oxidizable material can be changed to fit any specifically desired energy level. There will be a corresponding change in physical properties. Changes in physical and chemical properties can also be systematically made by varying the amount and kind of inorganic acid or acid mixture employed. Whereas the products normally obtained are thermosetting, they can be isolated in the thermoplastic stage if this is so desired.

Similarly, by using diisocyanates and diamines of the aliphatic and aromatic series and varying amounts and kinds of oxidizing acids one can also obtain a series of polyurethans with systematically varied physical and chemical properties. These, however, are normally thermoplastic but may be thermosetting if one of the starting compounds chosen is trifunctional, such as 3-aminopentamethylene diamine.

More generally stated, at least one basic, salt-forming nitrogen is reacted with a maximum of one equivalent (i.e. at least in equi-molecular proportions) of the strong oxidizing acid per basic nitrogen atom, resulting in a chemical combination containing sufficient oxidizing potential by way of combined acid to convert the nitrogen compound to gaseous decomposition products at suitable and selected temperatures and pressures. Upon proper activation as by the use of elevated temperature, the polymeric materials herein contemplated give rise to a tremendous evolution of gaseous products which manifest themselves in the development of high impulse energy levels and/or which are useful in gas generant applications and even more so in those associated with pyrotechnics and explosives.

In general, the condensation polymers derived from carbonyls and compounds containing amino groups require temperatures above about 250° C. to effect the desired decomposition almost instantaneously. The polymers from diisocyanates and diamines (polyurethans) undergo satisfactory gas formation at somewhat lower temperatures, that is, above about 180–200° C.

The decomposition of the polymeric salts of this invention may be carried out in a reaction motor, gas generator or other energy conversion mechanisms by any suitable means. Thus, the polymer mass may be heated either internally or externally by electrical means or by any indirectly applied heat exchange medium such as steam, hot gas, molten metals and the like. Once the critical decomposition temperature has been reached the reaction is self-sustaining and usually no further heating is necessary.

The following examples will serve to illustrate the present invention without being deemed limitative thereof:

EXAMPLE 1

One mole of urea and two moles of formaldehyde (aqueous solution) are mixed at ambient temperature and pressure. The temperature is then raised to 65° C. and within an hour a white suspension results. The temperature is then raised to 80° C. and held there for two hours. Two moles of nitric acid are added to the resulting, viscous, white, polymeric liquid, and heating is continued at 90° C. and 0.5 p.s.i.a. for 8 hours. This removes water from the system and completes the polymerization process. The result is a yellow, thermosetting solid. Upon heating the solid to 350° C. it decomposes to gaseous products.

EXAMPLE 2

One mole of urea and two moles of formaldehyde (aqueous solution) are mixed at ambient temperature and pressure. To the resulting solution, cooled to 5° C., is added one mole of nitric acid. The total mixture is next heated at atmospheric pressure and 90° C. for 8 hours. A viscous, yellow, polymeric liquid results. Water is next removed and polymerization completed by heating for 4 hours at 100° C. and 0.5 p.s.i.a. A pale yellow, thermosetting polymer results. Upon heating the polymer to 350° C. it decomposes to gaseous products.

EXAMPLE 3

Urea mononitrate and formaldehyde (aqueous solution) are combined at a mole ratio of 1:2 at 5° C. and atmospheric pressure. The temperature is gradually raised to 90° C., inducing polymerization. At this point a viscous, yellow, polymeric liquid is present. Pressure is then reduced to 0.5 p.s.i.a. and heating is continued at this pressure for 8 hours. Water is driven off and a pale yellow, thermosetting polymer is formed. Upon heating the polymer to 350° C. it decomposes to gaseous products.

EXAMPLE 4

Example 2 is repeated except that two moles of perchloric acid are used in lieu of nitric acid. The results are comparable. A small portion of the polymer salt is heated to 275° C. and at this temperature there is complete decomposition to gaseous products.

EXAMPLE 5

Example 2 is repeated except that two moles of nitric acid are used instead of one. The results are comparable. A small portion of the polymer salt is heated to 250° C. and at this temperature there is complete decomposition to gaseous products.

EXAMPLE 6

Melamine and formaldehyde (aqueous solution) are combined mole for mole at ambient temperature and pressure. To the resulting solution is added an equimolar amount of perchloric acid. A white suspension forms. On heating to 80° C. more rapid polymerization sets in. The pressure is then reduced to 0.5 p.s.i.a. to remove water. After 4 hours heating under vacuum a white, thermosetting polymer results which decomposes at 280° C.

EXAMPLE 7

To one mole of melamine are added three moles of formaldehyde (aqueous solution). The resulting solution is heated 2 hours at 60° C. and atmospheric pressure yielding a clear, viscous, polymeric liquid. To this is added one mole of nitric acid. Water is then removed by heating at 80° C. and 0.5 p.s.i.a. for 4 hours. This completes the polymerization and yields a white, thermosetting polymer which decomposes at 255° C.

EXAMPLE 8

Example 7 is repeated except that benzaldehyde is used in lieu of formaldehyde. Comparable results are obtained.

EXAMPLE 9

One mole of hexamethylenediisocyanate is reacted with one mole of hexamethylenediamine to form a thermoplastic polyurethan. The end product is slurried in methyl alcohol and treated with two moles of perchloric acid. The mixture is stirred 8 hours at ambient temperature and atmospheric pressure yielding a polymeric salt. Upon heating the salt to 190° C. there is complete decomposition to gaseous products.

EXAMPLE 10

Example 9 is repeated except that the diisocyanate of toluene is used in place of hexamethylenediisocyanate. Upon heating the final product to 200° C. there is decomposition to gaseous products.

In addition to the aldehydes, diamines and diisocyanates described above, it is also possible to employ any carbonyls, diamines and diisocyanates, aliphatic or aromatic, heretofore employed in the preparation of polyurethans and amine formaldehyde resins.

What is claimed is:

1. The process of making a polymeric substance characterized by its ability, upon heating, to decompose to render sufficient gaseous products as to render the substance useful as a rocket fuel and the like, which comprises mixing about one mole of urea with about one mole of formaldehyde at ambient temperature and pressure, inducing polymerization by elevating the temperature of the mixture to the order of about 80° C., adding about two moles of an acid selected from the group consisting of nitric acid, perchloric acid, sulfuric acid and phosphoric acid, and then removing water from the system and completing the polymerization process by heating the mixture under reduced pressure.

2. The process of making a polymeric substance characterized by its ability, upon heating, to decompose to render sufficient gaseous products as to render the substance useful as a rocket fuel and the like; which comprises mixing about one mole of urea with about two moles of formaldehyde at ambient temperature and pressure, cooling the mixture to about 5° C., adding from about one to about two moles of an acid selected from the group consisting of nitric acid, perchloric acid, sulfuric acid and phosphoric acid, inducing polymerization by elevating the temperature of the mixture to the order of about 90° C., and then removing water from the system and completing the polymerization process by heating the mixture under reduced pressure.

3. The process of making a polymeric substance characterized by its ability, upon heating, to decompose to render sufficient gaseous products as to render the substance useful as a rocket fuel and the like, which comprises mixing about one mole of urea mononitrate with about two moles of formaldehyde at atmospheric pressure and a temperature of about 5° C., inducing polymerization by elevating the temperature of the mixture to the order of about 90° C., and then removing water from the system and completing the polymerization process by heating the mixture under reduced pressure.

References Cited by the Examiner

UNITED STATES PATENTS

| | | | |
|---|---|---|---|
| 2,851,442 | 9/1958 | Michaud | 260—71 |
| 2,885,438 | 5/1959 | Porret et al. | 260—553 |
| 2,894,986 | 7/1959 | Beaver et al. | 260—553 |
| 2,901,886 | 9/1959 | Doerner | 60—35.4 |
| 2,915,875 | 12/1959 | Van Winkle et al. | 60—35.4 |
| 2,918,453 | 12/1959 | Widmer et al. | 260—67.6 |
| 2,929,816 | 3/1960 | Chemberlain | 260—249.6 |
| 2,982,636 | 5/1961 | Reynolds | 149—88 |

OTHER REFERENCES

Richter: "Textbook of Oragnic Chemistry," pages 230, 231, John Wiley, 1952.

SAMUEL H. BLECH, *Primary Examiner.*

C. B. PARKER, LEON D. ROSDOL, OSCAR VERTIZ, CARL D. QUARFORTH, *Examiners.*

G. K. MILESTONE, J. W. WHISLER, L. A. SEBASTIAN, *Assistant Examiners.*